INVENTOR.
JOHN JAMES SHEEHAN
BY
Teare, Teare & Sammon
ATTORNEYS

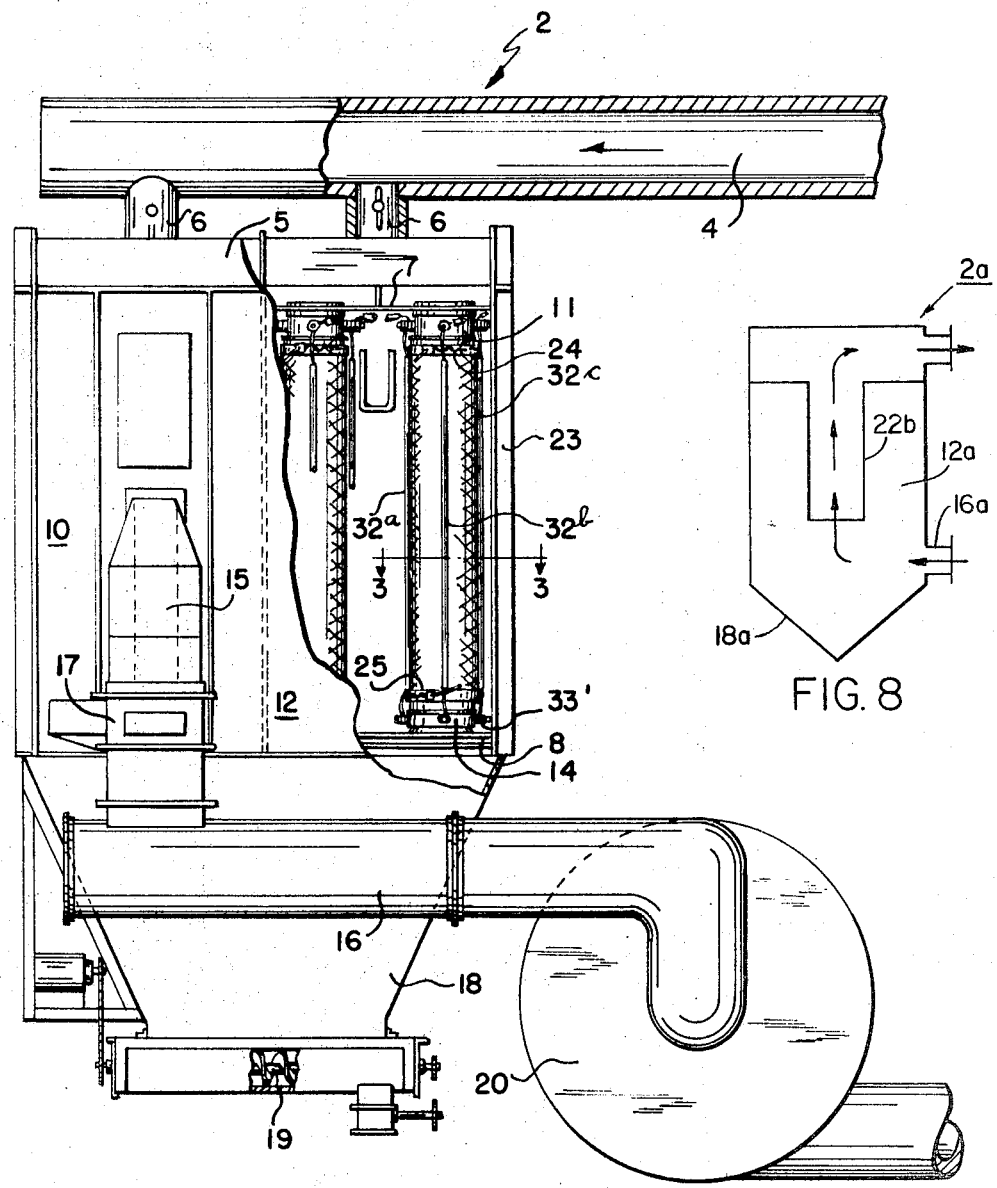
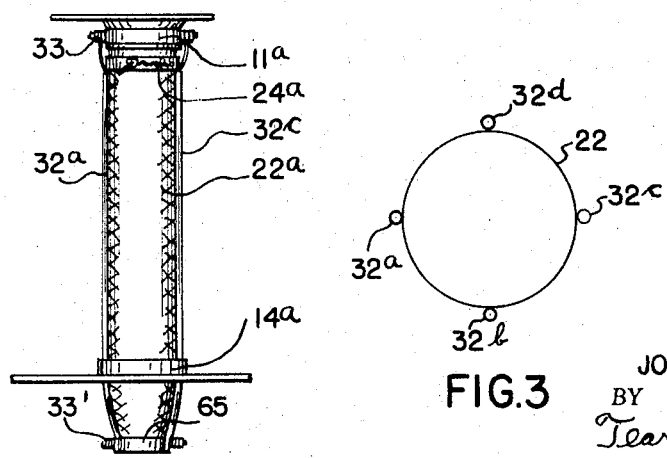

United States Patent Office 3,545,178
Patented Dec. 8, 1970

3,545,178
BAG TYPE SEPARATOR APPARATUS HAVING CLEANING MEANS THEREFOR
John James Sheehan, Berea, Ohio, assignor to Buell Engineering Company, Inc., Lebanon, Pa., a corporation of Delaware
Filed July 6, 1967, Ser. No. 651,609
Int. Cl. B01d 46/46
U.S. Cl. 55—272                                        8 Claims

ABSTRACT OF THE DISCLOSURE

A dust collecting apparatus for use in removing solids from a gaseous stream comprising, one or more collecting units having one or more filter members, such as fabric bags or the like, disposed in dust separating and/or collecting communication with each of the units for removing dust or the like from the gaseous stream, and electrically actuatable means including a plurality of electrically energizable conductor elements associated with the filter members for selectively deflecting the filter members so as to remove the collected dust therefrom.

BACKGROUND OF THE INVENTION

The present invention relates to the removal of solid materials, such as dust or the like, from a gaseous stream, and particularly relates to those devices, such as dust collectors, which employ a filter media for separating and/or collecting the dust from a gaseous stream.

Heretofore, in conventional type filter arrangements, the dust-laden gas has been directed interiorly or exteriorly of the filter media which has generally been in the form of a fabric-type filter bag. The gas has been caused to pass through the filter media with the dust or the like entrapped between the interstices of the fabric. Accordingly, in order to control the cleaning efficiency of the apparatus it was necessary to periodically remove the collected dust from the filter media.

In the past, the removal of such deposited dust has been achieved by various methods, such as by reverse-air flow, mechanical and/or electromechanical shaking, the use of sonic waves or any combination thereof. The reverse-air flow method has not been entirely satisfactory in that it is necessary to periodically shutdown or interrupt the operation during the cleaning process. In the use of such heretofore known mechanical or electromechanical shaking devices, it has been found that increased wear has been imparted to the filter media in addition to the difficulty that the shaking force was not delivered uniformly throughout the entire length of the filter media, such as in the case of elongated filter bag. Furthermore, in such types of shaking devices, filter wear is increased due to the severe or abrupt flexing action imparted by such devices. The more recent use of sonic vibratory devices has not been entirely satisfactory. Such devices have usually been employed as auxiliary equipment used in conjunction with the aforementioned methods and has not resulted in an efficient cleaning of the filter media.

SUMMARY OF THE INVENTION

The present invention relates to the removal of solid materials, such as dust or the like, from a gaseous stream, and more particularly relates to those devices, such as dust collectors, which employ filter members, such as fabric bags, envelopes, screens or the like, for removing the dust entrained in the gaseous streams.

The invention more particularly contemplates the provision of a novel mechanism in the form of electrically actuatable means which may include a plurality of electrically energizable conductor elements associated in deflecting relationship with the filter members for selectively and uniformly deflecting the same so as to efficiently remove deposited dust or the like therefrom.

The mechanism of the invention provides a continuous cleansing of the filter members during the separating and/or collecting operation so as to increase the cleaning efficiency and the through-put rate of the apparatus, such as a dust collector. Such arrangement provides a more uniform and less abrupt flexing or deflecting action on the filter members so as to reduce damage or actual breakage thereof after extended usage. In addition, such arrangement may be made as an integral part of the filter media so as to eliminate wear and/or abrasion between the parts during the cleaning operation. The mechanism is of a simple, yet durable construction which is relatively inexpensive to produce and install, and is of a construction which lends itself to quick and easy assembly and disassembly thereof.

BRIEF DESCRIPTION OF THE DRAWINGS

FIG. 1 is a partially broken, generally diagrammatic, side elevation view of a dust collecting apparatus embodying the novel filter arrangement of the present invention;

FIG. 3 is an enlarged horizontal section view taken along the line of 3—3 of FIG. 1;

FIG. 7 is a side elevation view showing a modification of the invention which employs another type of filter bag; and FIG. 8 is a diagrammatic illustration showing another modification of another type of dust collecting apparatus which may be employed in connection with the present invention.

DESCRIPTION OF THE PREFERRED EMBODIMENTS

Figure 2:
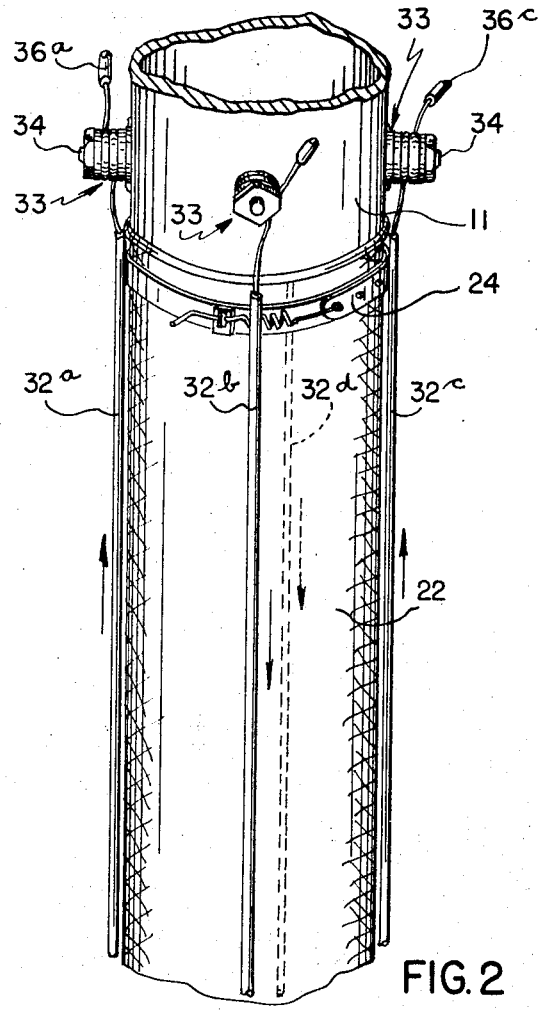
FIG. 2 is a fragmentary, generally perspective view on an enlarged scale showing one of the filter members removed from the assembly of FIG. 1.

Referring again to the drawings, and in particular to FIG. 1 thereof, there is illustrated a dust collecting apparatus, designated generally at 2, which has a series of filtering units or compartments 10 and 12, each of which contains a plurality of vertically oriented filter bags 22. The compartments 10 and 12 may be mounted on a hopper 18, at the base of which a screw-type conveyor 19 may be provided for removing collected dust discharged from the interior surface of the bags.

As shown, a dust air, inlet duct 4 may extend across the top of all of the compartments and communicate therewith via preferably valve or baffle controlled ducts 6 and plenum 5, through which the dust-laden air to be cleaned passes. An exhaust ductwork 15 extends downwardly from the side of each compartment. The air, after being passed through the walls of the bags in each compartment, is drawn through the ductwork 15 and then passes via a damper or butterfly-type device, as at 17, to a manifold pipe 16 which is connected to the suction side of a fan or a blower 20, from whence the clean air may be transmitted to the desired location.

The bags 22 are preferably made of a fabric material having a smooth, slippery finish, such as siliconized cloth, glass or Dacron. Preferably, in the form shown, the bags 22 are open at both ends and are connected at the tops thereof to an apertured top plate 7 and at the bottom ends to an apertured lower plate 8 which plates are connected to the frame 23 of the collector. The upper ends of the bags 22 may be attached as by means of a locking clamp 24 (FIG. 2), to a sleeve 11 which is secured to the upper plate 7, such as by weldments or the like. The lower ends of the bags 22 may be similarly attached, as by means of clamps 25 (FIG. 1) to another sleeve 14 which is secured to the bottom plate 8, such as by weldments or the like. By this arrangement, the dust-laden air is transmitted downwardly through the bags 22 via the apertured plate 7 so that the clean air passes transversely through the material of the bags and with the trapped dust being collected on the interior surface of the bags ready for subsequent removal.

Now in accordance with the invention, the dust trapped on the interior surfaces of the bags 22 may be effectively removed by means of an electrically actuatable mechanism, designated generally at 30 (FIG. 4), for selectively deflecting the material of the bags and hence, for dislodging the entrained dust therefrom. In the embodiment shown, the mechanism may include a plurality of electrical conductor elements, such as wire, strips or braided conductors, which may be made from a good electrical conductive material, such as ductile iron or the like. In the invention, it is preferred that at least two such conductor elements be disposed in opposing relationship to one another so that the flow of current therethrough will provide an inward attraction of the elements toward one another, thereby to provide the desired bag deflection. Preferably, for the filter bags having a generally circular cross-sectional shape four (4) conductor elements, such as 32a, 32b, 32c and 32d, are disposed in circumferentially spaced relationship around the exterior periphery of the bag so as to define a corresponding number of quadrants therebetween, as best seen in FIG. 3. It has been found that by this quadrant or 90° spacing between the conductor elements, that a maximum deflection is imparted to the bag material so as to achieve an efficient removal of entrained dust upon deflection thereof.

The conductor elements preferably extend longitudinally the full length of the respective bags 22 and are disposed in close proximity to the bag material (i.e., exterior or interior surfaces) so as to achieve a maximum bag deflection. Preferably, the conductor elements are made integral with the bag material, such as by being woven therewith, or attached thereto, such as by sewing, fasteners, adhesives or the like.

Figure 4:
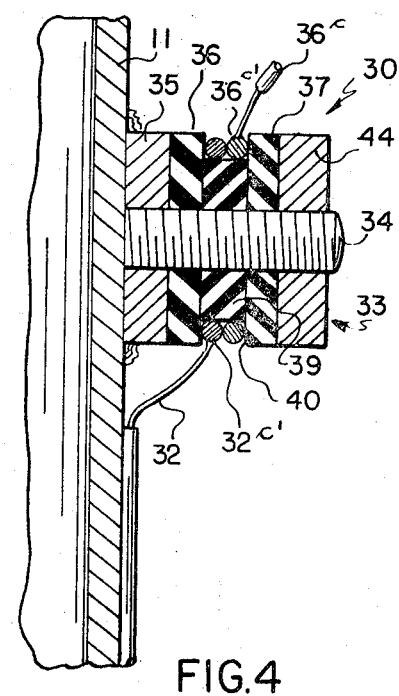
FIG. 4 is a fragmentary, sectioned view, on an enlarged scale, showing the terminal arrangement for connecting the electrically energizable conductor elements to a source of power.

The conductor elements may be electrically connected to the respective bags 22 by one of several arrangements. In the form shown, the conductor elements 32a, 32b 32c and 32d may each be connected at their upper ends to respective terminals, such as 33, which may be mounted on the sleeve 11, as shown in FIGS. 2 and 4. The terminals 33 may each comprise a threaded post member 34 which may be attached at one end to the sleeve 11 by means of a metal collar plate 35 which is secured to the sleeve 11, such as by weldments or the like. A pair of spaced insulating washers 36 and 37 are mounted on the post member 34; between the washers is inserted an insulating sleeve 39 having a reduced diameter so as to provide an annular recess 40 between the washers 36 and 37. Each of the conductor elements, such as 32c, may be welded at its end to a first metal ring, such as 32c'. A second metal ring, such as 36c may be disposed in the recess 40 adjacent to the first ring 32c' and held in tight abutting relationship, such as by tightening fastener 44, so that good electrical contact is established between the rings. The second ring on each terminal, such as ring 36c' may be welded to a wire 36c which may connect the conductor element, such as element 32c, to adjacent conductor elements or to the power source depending on the particular circuitry chosen, as discussed hereinafter.

The lower ends of the respective conductor elements may be connected to adjacent conductor elements or to the power source by means of similar terminals 33' which are mounted on the sleeve 14 (FIG. 1). Hence, the terminals 33 and 33', in the form shown, not only provide a support for the respective conductor elements, but also provide for an electrical connection between the respective conductor elements and the power source and/or between one or more of the electrical connector elements in accordance with the circuitry described hereinafter, to provide deflection of the filter bags upon energization of the circuitry.

In accordance with the invention, upon energization of the conductor elements, current is caused to flow in the same or opposite direction in diametrically opposed of the elements, such as in a downward direction in elements 32a and 32c, and in an upward direction, such as in elements 32b and 32d, as seen in FIG. 2, or the elements 32a, 32b, 32c, and 32d may be arranged with respect to one another to achieve current flow in the opposite direction in diametrically opposed conductors in a manner well known to one skilled in the art. The magnetic field produced by the current flow through the conductor elements will cause diametrically opposed of the elements to be attracted inwardly toward one another, thereby drawing the material of the filter bag inwardly toward its longitudinal central axis. Upon deenergization of the conductor elements, such as by timer device 81 or 93, current will cease to flow so that the material of the filter bags will hang limp or move outwardly in a direction toward the initial position thereof. This sequential inward and outward movement of the conductor elements toward and away from another causes an effective deflection of the bag material for efficiently removing the entrained dust from the interior surfaces of the bags. Accordingly, it is preferred that the filter bags, as well as the conductor elements, have a sufficient slack so as to allow the desired deflection thereof.

Figure 6:
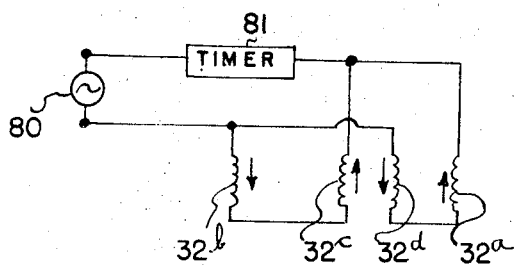
FIG. 6 is a diagrammatic illustration showing another form of power source and another form of circuitry which may be used in the present invention.

In accordance with the invention, one or more electrical circuits may be provided which include one or more of the conductor elements or portions thereof. A preferred circuit for the conductors of FIG. 2 is shown in FIG. 6. A source 80 of alternating current is connected to a timing device 81. The timing device may be any suitable device which will periodically open and close the circuit at predetermined periodic intervals. As a result of the foregoing arrangement, a current pulse will periodically energize the circuit. The circuit is a series-parallel circuit wherein series connected conductors 32a and 32d are connected in parallel with series connected conductors 32c and 32b. By the foregoing arrangement the current flowing through conducting elements 32a and 32c will always be in the same direction while the current flowing through conducting elements 32b and 32d will always be in the opposite direction to the flow through conductors 32a and 32c. The arrows in FIGS. 2 and 6 illustrate the aforesaid flow for one-half cycle. During such half-cycle all the conductors will tend to move towards the center of the bag thereby flexing the bag. In the next half cycle the current direction will change, but since it changes the same for all conductors, the current flow through conductor 32a will be in the same direction as the current flow through conductor 32c (since they both change directions from the last half cycle) while the current flow through conducting elements 32b and 32d will flow in the opposite direction from the flow through conducting elements 32a and 32c and the conducting elements 32a, 32b, 32c and 32d will remain in their flexed position. When the timer 81 opens the circuit, the bags will return to their original position.

Figure 5:
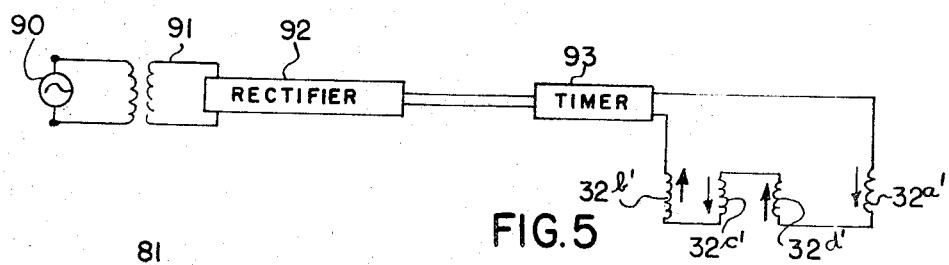
FIG. 5 is a diagrammatic illustration showing one type of power source and illustrating one type of circuitry which may be employed in the invention.

A modified circuit is shown in FIG. 5. An alternating current source 90 may be connected to the circuit, such as by a step-down transformer 91, a rectifier 92 and a timing device 93, whereby a periodically pulsifying direct current is passed through the circuit. The circuit of FIG. 5 has the conductor elements 32a', 32d', 32c' and 32b' connected in series. Since the conductor elements are disposed vertically, as shown in FIG. 2, the current flow through conductors 32a' and 32c' will be in one direction (between the bottom of the conductors and the tops thereof, as shown in FIG. 2) and in the opposite direction conductors 32d' and 32b'. Thus, the conductors will tend to move towards the center of the bag (FIG. 2) upon energization of the circuit.

The aforesaid circuitry may be established by connecting the leads of conductors 32a, 32b, 32c and 32d in the arrangement of the circuitry chosen by way of leads between the conducting elements and/or the energizing source, as by the terminals 33, as described previously.

The conductor elements 32a, 32b, 32c and 32d are preferably arranged in the evenly spaced quadrant arrangement shown in FIG. 2.

By the foregoing arrangement, the rate of deflection and hence, the amount of entrained dust or the like discharged from the filter bags, may be controlled as desired. The rate of discharge will, of course, depend upon such factors as the relative size of the filter bags, the size of the conductor elements, the amount and duration of the electrical energy supplied, and the size of the dust particles to be removed.

In FIG. 7 there is illustrated a modification of the invention wherein another type of filter bag 22a may be employed in accordance with the invention. In this form, the bag may again be open at both ends and attached at the upper end to the sleeve 11a via clamp 24a. As shown, however, the lower end of the bag is disposed in loose relation through the sleeve 14a and may include at its terminal end a collar or ring 65 attached thereto for holding the bag in a taut condition. Here again, the bag is provided with a plurality of electrical conductor elements 32a, 32b, 32c and 32d connected to the sleeve 11a and ring 65 via the aforementioned type of terminals 33 and 33' for the purposes, as aforesaid. By this arrangement, simple disconnection of the upper terminals 33 enables the bag to be removed, as a unit, from the sleeve 11a upon loosening of the clamp 24a, thereby to facilitate replacement thereof.

In FIG. 8 there is schematically illustrated a modification of the invention which is generally similar to that described in connection with FIGS. 2 to 6 of the drawings, except that the dust collector apparatus 2a shown, is of the type wherein the dust-laden air to be cleaned enters the bottom of the hopper 18a via an inlet duct 16a and into the compartment 12a. In this form, the filter bags 22a are of a closed-bottom construction wherein the air passes through the bag material so that the dust is deposited on the exterior surface of the bag and the clean air is passed upwardly and out of the collector, as shown by the arrows.

Though in the embodiments shown, the filter bags have been illustrated as being of a sleeve or tubelike construction and open at one or both ends thereof, it is to be understood that the principles of the present invention may also be applied to other types of filter construction, such as the envelope or screen type of filter devices which may be employed for the same or similarly related purposes.

In a typical operation of the invention and when employed with the type of dust collector illustrated in FIG. 1, actuation of the blower unit 14 causes dust-laden air entering the inlet duct 4 to be drawn downwardly through the respective filter bags 22, whereupon, the air passes generally transversely through the bags so that the dust is trapped on the interior surface of the bags. Clean air passes via the exhaust ductwork 15 into the manifold pipe 16 from when it is transmitted to the desired location for subsequent usage. When it is desired to clean the filter bags 22 (i.e., chamber 12 of collected dust) the conductor elements 32, 32b, 32c and 32d are simultaneously energized in response to actuation of the timer 60 (FIG. 5) which may be preset to provide a predetermined periodic time interval for controlling the transmission of electrical energy from the power source 56. Energization of the conductor elements in the manner described causes diametrically opposed of the elements to gradually move inwardly toward one another so as to impart a corresponding inward deflective movement to the bag material. With maximum deflection, the confronting opposed surfaces of the filter bags may actually engage one another so as to dislodge entrained dust therefrom. Deenergization of the conductor elements in response to deactuation of the current source by the timer 60 enables the elements and the bag material to move outwardly back into the initial position thereof. Such movement is facilitated by the inherent slack in the conductor elements and the filter bag material. Accordingly, by proper periodic sequencing of energization and deenergization of the conductor elements, the desired amount of deflection can be imparted to the conductor elements so as to effectively dislodge collected dust from the interior surface of the filter bags. This dislodged dust may then be passed, as by gravity, downwardly into the hopper 18 from whence it may be removed to the desired location via screw conveyor 19.

The invention may also be employed in conjunction with a reverse-air flow operation, as desired. In such case, reverse air (counter to the flow in incoming dust-laden air) which may be atmospheric or pressurized air may be admitted to the respective chamber for imparting an additional shaking action to the filter bags for aiding in the removal of collected dust. Such reverse-air flow type device is described in the United States patent to Eiben 3,224,172.

An example of the parameters involved is as follows: Current, 230 amps.; voltage, 20 volts; length of conductor elements, 9'0"; conductor elements comprise a strip of woven copper fabric about 1/16 inch thick and 3/8 inch wide.

What is claimed is:

1. A filter device of the type for removing solids from a gaseous stream, said device comprising, a filtering compartment including an inlet opening adapted to be connected to a gaseous stream of dirty air under pressure and an outlet opening adapted to discharge clean air therethrough from said filtering compartment, a porous flexible filter member disposed within said filtering compartment, said filtering compartment including a frame and said filter member being supported by said frame between said inlet and outlet openings in the path of said gaseous stream, a plurality including at least one pair of flexible magnetizable conductor elements supported by said frame and connected to a source of electrical energy, said conductors being disposed in spaced relation from one another and insulated from said frame and being operatively constructed and arranged to conduct electrical current therethrough, at least one of said conductor elements being disposed adjacent to said filter member in sufficiently close proximity thereto to move the same upon simultaneous magnetization of said conductor elements upon the flow of electrical current therethrough, a timing means operably connected in the electrical circuit with said source of electrical energy and said conductor elements for intermittently applying electrical energy thereto causing said at least one conductor element to move with respect to said other of said elements for dislodging dust collected on said filter member with movement of said at least one conductor resulting in movement of said filter member, and said at least one conductor element being in contact with said filter member when it moves said filter member.

2. A filter device in accordance with claim 1, wherein said filter member comprises an elongated tubelike member, and wherein said conductor elements extend generally longitudinally of said tubelike member.

3. A filter device in accordance with claim 2, wherein said tubelike member is generally of a circular shape in transverse cross-section, and said conductor elements are disposed in circumferentially spaced relationship about the periphery of said tubelike member.

4. A filter device in accordance with claim 3, wherein at least one pair of said conductor elements are disposed in generally diametrically opposed relationship with respect to one another and connected to said source of electrical energy in a sense whereby the current flows in the same direction through said elements for moving them toward one another.

5. A filter device in accordance with claim 3, wherein at least one pair of said conductor elements are disposed in generally diametrically opposed relationship with respect to one another and connected to said source of electrical energy in a sense whereby the current flows in the opposite direction through said elements for moving them away from one another.

6. A filter device in accordance with claim 1, wherein said filter member comprises a fabric member, and wherein said conductor elements are attached to fabric member.

7. A filter in accordance with claim 1, wherein said conductor elements are arranged in spaced pairs extending in generally parallel relation with respect to one another.

8. A filter device in accordance with claim 1, wherein said conductor elements are disposed in spaced relation from said filter member.

References Cited

UNITED STATES PATENTS

| | | | |
|---|---|---|---|
| 1,190,221 | 7/1916 | Daugherty | 55—381X |
| 1,516,444 | 11/1924 | Lough | 55—287X |
| 1,757,834 | 5/1930 | Haegler | 55—334X |
| 2,800,976 | 7/1957 | Pellon | 55—287 |
| 3,377,781 | 4/1968 | Hammond | 55—304X |
| 1,512,776 | 10/1924 | Lough | 55—300 |
| 1,538,985 | 5/1925 | Greene | 55—300 |
| 1,574,422 | 2/1926 | Feind | 55—360 |
| 2,684,126 | 7/1954 | Doyle | 55—360 |
| 3,326,383 | 6/1967 | Pranovi | 55—300X |

FOREIGN PATENTS

| | | | |
|---|---|---|---|
| 282,743 | 5/1928 | Great Britain | 55—300 |
| 449,828 | 7/1936 | Great Britain | 55—305 |
| 582,292 | 11/1946 | Great Britain | 55—300 |
| 963,672 | 7/1964 | Great Britain | 55—304 |
| 217,728 | 2/1942 | Switzerland | 55—379 |
| 63,725 | 7/1945 | Denmark | 55—283 |
| 256,418 | 2/1913 | Germany | 55—273 |
| 614,540 | 12/1948 | Great Britain | 55—304 |
| 1,274,656 | 9/1962 | France | 55—300 |

OTHER REFERENCES

Watson, W.: "A Textbook of Physics," Longmans, Green and Co., 4th Ave. and 30th Street, New York, N.Y. (1920), 7th ed., pp. 749 and 750.

DENNIS E. TALBERT, JR., Primary Examiner

U.S. Cl. X.R.

55—283, 300, 304, 341, 378, 432; 210—332, 407; 310—10